Figure 1:
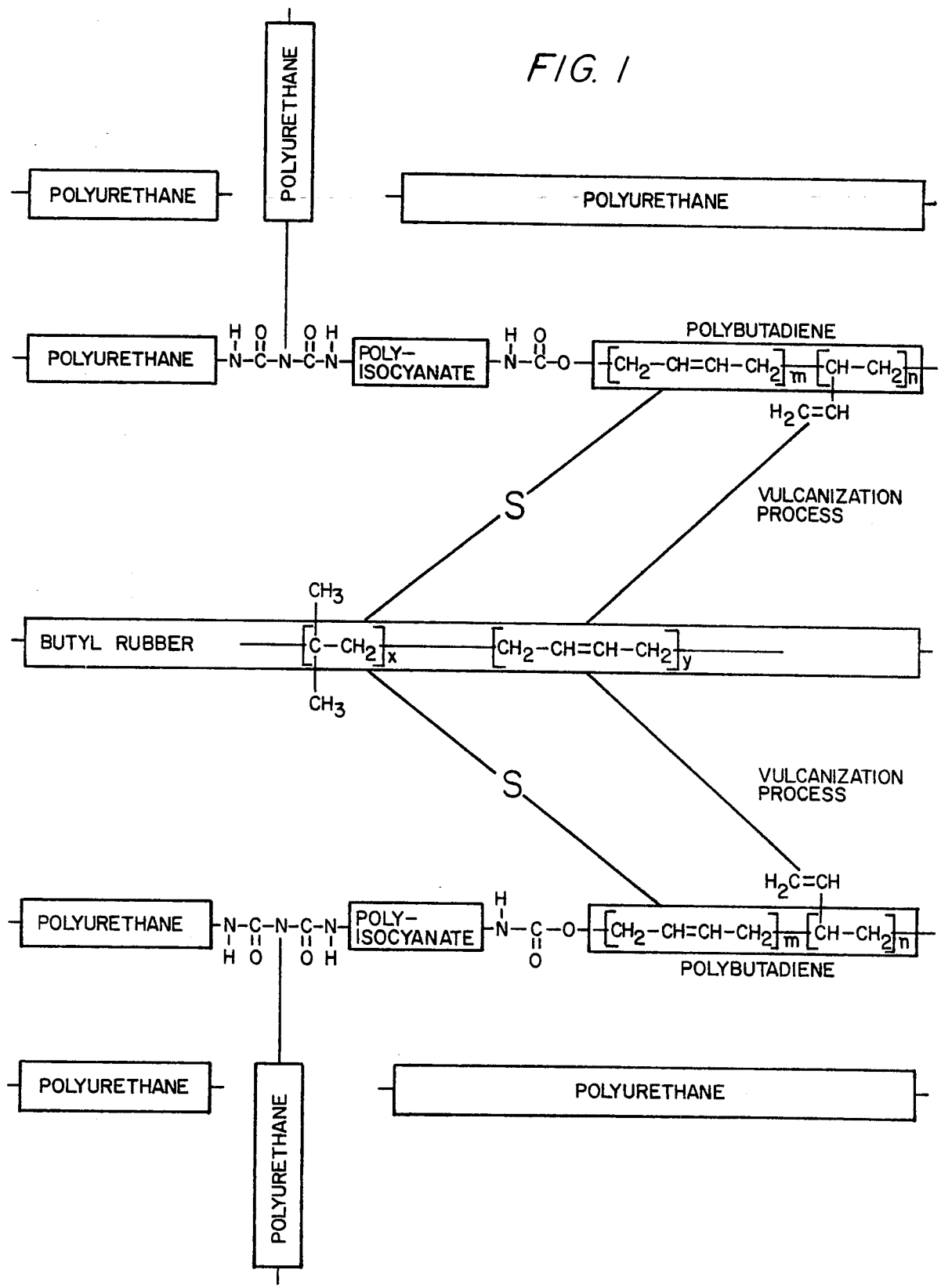

United States Patent [19]

Spahic et al.

[11] Patent Number: 4,552,816

[45] Date of Patent: Nov. 12, 1985

[54] PROCESS FOR PRODUCING RUBBER LAMINATES

[75] Inventors: Bojana K. Spahic, San Jose; George F. Green, Hayward, both of Calif.

[73] Assignee: Novacor Medical Corporation, Oakland, Calif.

[21] Appl. No.: 665,011

[22] Filed: Oct. 30, 1984

Related U.S. Application Data

[63] Continuation-in-part of Ser. No. 557,856, Dec. 5, 1983, abandoned.

[51] Int. Cl.$^4$ .................. B32B 7/10; B32B 31/06; B32B 27/40
[52] U.S. Cl. ........................... 428/420; 156/306.9; 156/331.1; 156/331.4; 156/331.7; 156/334; 427/302; 427/340; 427/412.5; 428/423.3; 428/423.9; 428/424.8; 428/517; 428/519
[58] Field of Search ............... 428/420, 424.8, 423.9, 428/517, 519, 423.3; 427/302, 340, 412.5; 156/331.1, 331.7, 334, 306.9

[56] References Cited

U.S. PATENT DOCUMENTS

| | | |
|---|---|---|
| 2,905,582 | 9/1959 | Coleman, Jr. et al. |
| 3,528,848 | 9/1970 | Zoebelein ............... 428/423.9 |
| 3,925,590 | 12/1975 | Hausch et al. |
| 4,042,441 | 8/1977 | Wasserman ............... 428/420 |
| 4,053,680 | 10/1977 | Wasserman ............... 428/420 |
| 4,232,608 | 11/1980 | Wrightson ............... 428/420 |
| 4,328,281 | 5/1982 | Wrightson ............... 428/420 |
| 4,332,858 | 6/1982 | Saitoh ............... 428/519 |
| 4,337,111 | 6/1982 | Kauffman ............... 428/420 |

*Primary Examiner*—Ellis P. Robinson
*Attorney, Agent, or Firm*—Fitch, Even, Tabin & Flannery

[57] ABSTRACT

The invention discloses a novel process for producing covalently bonded laminated structures composed of polyurethane elastomer and vulcanized rubber layers. As the joining means for covalently bonding the polyurethane elastomer and vulcanizable rubber laminates the process utilizes novel grafted polyurethane joining compositions comprised of polyurethane elastomer, a polyisocyanate, and a hydroxyl containing polybutadiene difunctional linker molecule. In practicing the process of the invention, the grafted polyurethane joining composition is first prepared by means that create covalent chemical bonds between the polyurethane elastomer and a first functional (NCO) group on the polyisocyanate, as well as between a hydroxyl on the polybutadiene difunctional linker molecule and a second functional (NCO) group on the polyisocyanate. This novel grafted polyurethane composition is then used to bond layers of polyurethane elastomer to layers of vulcanizable rubber. In constructing a laminated product, the grafted polyurethane joining composition is interposed between the polyurethane elastomer and vulcanizable rubber layers. The resulting assembly is then heated at a temperature sufficient to allow formation of covalent bonds.

7 Claims, 1 Drawing Figure

PROCESS FOR PRODUCING RUBBER LAMINATES

BACKGROUND OF THE APPLICATION

This application is a continuation-in-part of U.S. Ser. No. 557,856 filed Dec. 5, 1983 now abandoned.

FIELD OF THE INVENTION

This invention relates generally to an improved process for producing laminates between noncompatible rubbers. More specifically, the invention relates to an improved process for producing laminates between polyurethane elastomers and vulcanizable rubbers. The invention also relates to a novel laminated product comprised of polyurethane elastomers and vulcanizable rubber layers.

PRIOR ART

The problems associated with producing durable laminates comprised of polyurethanes and vulcanizable rubbers are well known. These problems arise mainly because the polyurethanes and the vulcanizable rubbers do not covalently bond directly with one another. As a result, it is necessary to join the polyurethane and rubber layers by means of adhesives or linking compounds. The prior art teaches several such adhesives and linking compositions. The most successful of these compositions contain isocyanates and nitroso compounds.

For example, U.S. Pat. No. 2,905,582 teaches a polyurethane can be bonded to an olefinic rubber by interposing between such compounds an adhesive that includes in combination an organic isocyanate and an aromatic compound containing at least one nitroso group attached directly to a ring carbon atom. In addition, U.S. Pat. No. 2,905,582 suggests the adhesive compositions contain a so-called organic film-forming material such as natural or synthetic elastomer or resin.

U.S. Pat. No. 3,925,590 also teaches an adhesive composition useful for bonding polyurethane to olefinic rubbers. The adhesive composition of U.S. Pat. No. 3,925,590 utilizes an organic isocyanate as well as a compound that includes a hydrocarbylamide function to which a nitroso function is chemically bound. For best results, U.S. Pat. No. 3,925,590 also suggests the adhesive compositions contain a so-called organic film-forming material.

Although the foregoing patents and other prior art may be satisfactory to produce polyurethane and rubber laminates useful in the production of tires, and other semiflexible articles used externally, none of the prior art techniques teaches a process for producing durable laminates comprised of polyurethane and vulcanizable rubbers joined by means of a grafted, chemically bonded joining composition that does not rely on the nitroso function. Such laminates would be especially useful in the construction of implantable biomedical devices.

OBJECTS OF THE INVENTION

It is an object of the present invention to provide an improved process for producing laminates comprised of noncompatible rubbers.

Another object of the present invention to provide an improved process for producing laminates comprised of polyurethane elastomers and vulcanizable rubbers.

Another object of the present invention to provide an improved process for bonding polyurethane elastomers to a vulcanizable rubber whereby the bond strength between the component parts is such that, under stress, failure will occur in the polyurethane elastomer or the vulcanizable rubber rather than at the bond interface.

Another object of the present invention is to provide an improved process for producing durable laminates comprised of polyurethane elastomers and vulcanizable rubbers joined by means of a grafted chemically bonded joining composition.

Another object of the present invention to provide an improved process for producing durable laminates comprised of polyurethane elastomers and vulcanizable rubber that does not utilize nitroso compounds.

Another object of the present invention is to provide an improved process for producing durable laminates comprised of polyurethane elastomer and vulcanizable rubbers joined by means of a grafted chemically bonded joining composition containing a polybutadiene having at least one functional hydroxyl (OH) group.

Another object of the present invention is to provide an improved process for producing durable laminates comprised of polyurethane elastomer and vulcanizable rubbers joined by means of a grafted chemically bonded joining composition containing a hydroxyl terminated polybutadiene.

Another object of the present invention is to provide an improved process for producing durable laminates comprised of polyurethane elastomer and vulcanizable rubbers joined by means of a grafted chemically bonded joining composition containing a hydroxyl terminated polybutadiene glycol.

Another object of the present invention is to provide a novel laminated product comprised of polyurethane elastomer and vulcanizable rubber layers.

Another object of the present invention to provide a novel laminated product comprised of polyurethane elastomer and vulcanizable rubber layers bonded to one another such that failure of the laminated product will result from failure in the polyurethane elastomer or the vulcanizable rubber rather than at the bond interface.

Another object of the present invention is to provide a novel laminated product comprised of polyurethane elastomers and vulcanizable rubbers joined by means of a grafted chemically bonded joining composition.

Another object of the present invention is to provide an improved process for producing durable laminates comprised of polyurethane elastomers and vulcanizable rubbers that does not utilize nitroso compounds.

Another object of the present invention is to provide a novel laminated product comprised of polyurethane elastomers and vulcanizable rubbers joined by means of a grafted chemically bonded joining composition containing a polybutadiene having at least one functional hydroxyl group.

Another object of the present invention is to provide a novel laminated product comprised of polyurethane elastomers and vulcanizable rubbers joined by means of a grafted chemically bonded joining composition containing a hydroxyl terminated polybutadiene.

A still further object of the present invention is to provide a novel laminated product comprised of polyetherurethane and vulcanizable butyl rubber joined by means of a grafted chemically bonded joining composition containing a hydroxyl terminated polybutadiene glycol.

Other objects of the invention will become apparent from the following specification and claims.

DRAWINGS

The present invention will become more readily understood from a consideration of the drawing in which:

FIG. 1 is a diagrammatic elevational end view illustrating an assembly bonded in accordance with an embodiment of the present invention.

SUMMARY OF THE INVENTION

Very generally the invention discloses a novel process for producing covalently bonded laminated structures composed of polyurethane elastomers and vulcanized rubber layers. As the joining means for covalently bonding the polyurethane elastomers and vulcanizable rubber laminates, the process of the invention utilizes novel grafted polyurethane joining compositions comprised of polyurethane elastomer, a polyisocyanate and a polybutadiene linker molecule containing at least one functional hydroxyl (OH) group. In practicing the process of the invention, a grafted polyurethane composition is first prepared by means that create covalent chemical bonds between a functional moiety on the polyurethane and the polyisocyanate, as well as between the polyisocyanate and a hydroxyl on the polybutadiene linker molecule. This novel grafted polyurethane joining composition is then used to bond layers of polyurethane elastomer to layers of vulcanizable rubber. In constructing a laminated product, the grafted polyurethane joining composition is interposed between polyurethane elastomer and vulcanizable rubber layers. The resulting assembly is then heated at a temperature sufficient to allow formation of covalent bonds.

Laminated structures prepared by the process of the present invention will be comprised of polyurethane elastomer and vulcanized rubber laminates covalently bonded by means of polyisocyanate and hydroxyl containing polybutadiene linker molecules. As a result, these laminated structures have bond strengths superior to many of those taught by the prior art.

The present invention is broadly applicable to the bonding of vulcanizable rubbers and polyurethane elastomers. As used herein, polyurethane elastomer means polymers comprised of polyisocyanate extended polyols. Such polyurethane elastomers are typically prepared by reacting a polyisocyanate compound, usually a diisocyanate, with a relatively high molecular weight polyol (a macroglycol such as polyester glycol, polyether glycol, polybutadiene glycol, etc.,) and then chain extending with a diol, diamine or water. The particular polyol selected will depend on the characteristics desired in the ultimate product. The reaction of the isocyanate with the polyol provides the typical urethane group, OCONHR, from which the product obtains its name. Polyurethane elastomers useful in practicing the process of the present invention include, but are not limited to, polyether urethanes, polyester urethanes, polycaprolactam urethanes, polybutadiene urethanes and polyurethane ureas.

The process of the present invention provides a means for bonding polyurethane elastomers to vulcanizable rubbers. Rubbers preferred for use in the process of the present invention are sulfur vulcanizable rubbers; they can be natural rubbers or unsaturated synthetic rubbers. Especially preferred rubbers include, but are not limited to, butyl rubbers, chlorobutyl rubbers, bromobutyl rubbers, polyisoprene rubbers, gutta-percha rubbers, polybutadiene rubbers, styrene-butadiene rubbers, nitrile rubbers and the like. The rubbers may be filled or unfilled.

As the joining means for covalently bonding the polyurethane elastomer and vulcanizable rubber laminates, the process of the present invention utilizes novel grafted polyurethane joining compositions containing a polyisocyanate and a hydroxyl containing polybutadiene linking compound. The term polyisocyanate is used generically to mean any organic compound containing two or more isocyanate (NCO) groups. Any polyisocyanate may theoretically be employed in the process of this invention since the isocyanate grouping is the functional material in the bonding phenomena, thus making the remainder of the molecule relatively unimportant for the present purpose. A wide variety of polyisocyanates are available. The preferred polyisocyanates will comprise molecules containing two isocyanate groups, that is the diisocyanates. Especially preferred diisocyanates include, but are not limited to, 4,4'-diphenylmethane diisocyanate, toluene diisocyanate, 1,5-naphthalene diisocyanate, 1,6-hexamethylene diisocyanate, 4,4'-dicyclohexylmethane diisocyanate.

The novel grafted polyurethane compositions utilized in bonding the polyurethane elastomer and vulcanizable rubber laminates also contain a cross-linking difunctional molecule capable of forming covalent bonds with an isocyanate group (NCO) as well as with functional moieties contained within the vulcanizable rubber compositions. According to the invention the cross-linking molecules are polybutadienes having at least one reactive hydroxyl (OH) group. The preferred cross-linking molecule is a hydroxyl terminated polybutadiene R—$(CH_2—CH=CH—CH_2)_n$—OH. Especially preferred is polybutadiene glycol HO—$(CH_2—CH=CH—CH_2)_n$—OH. Of the polybutadiene glycols, those having molecular weights of between 1000 and 4000 are especially preferred.

In carrying out the method of the present invention in its preferred form, a grafted polyurethane joining composition, comprised of a polyurethane elastomer, a polyisocyanate, and a hyroxyl terminated polybutadiene cross-linking compound, is interposed between the surfaces of vulcanizable rubbers and polyurethane elastomers to be bonded together. In these grafted polyurethane joining compositions, the hydroxyl terminated polybutadiene linker molecule will at least be available at the interface between the vulcanizable rubber substrate and the grafted polyurethane joining composition.

Unlike prior art methods which teach that the nitroso and isocyanate bonding compounds can be applied directly to the surfaces of the polyurethanes and rubbers, or alternatively can be intermixed within a film-forming material, the process of the present invention teaches: (1) formation of grafted polyurethane joining compositions which contain a hydroxyl terminated polybutadiene cross-linking molecule covalently bound to an isocyanate group; and then (2) use of the joining composition to bond the polyurethane elastomer and vulcanizable rubber layers to one another.

Unlike prior techniques that merely suspend the isocyanate and nitroso compounds in a film-forming material, the process of the present invention also teaches the formation of a joining composition wherein the linking molecules are covalently bonded to one another. Since the component parts of the joining composition are covalently bonded to one another leaching of the linking molecules is eliminated. This is important if laminated structures are used internally as components of implantable devices. Covalent bonding also assures bond strengths that are superior to those provided by other prior methods. For example, in bonding polyurethane elastomers to vulcanizable rubbers in accordance with the process of the present invention, the resultant bond strengths are greater than the cohesive strength of the vulcanized rubber layer. As a result the polyurethane elastomer and vulcanized rubber laminants cannot be separated without tearing into the vulcanized rubber.

The grafted polyurethane joining composition utilized in the process of the present invention is preferably prepared by reacting polyurethane elastomer, a polyisocyanate containing compound and a hydroxyl terminated polybutadiene cross-linking compound in the presence of heat sufficient to allow formation of covalent bonds between urethane or urea moieties on the polyurethane polymer and a first isocyanate moiety on the polyisocyanate, as well as between a hyroxyl group on the polybutadiene molecule and another isocyanate group on the polyisocyanate containing compound.

The relative proportions of the main components of the grafted polyurethane joining compositions will vary depending upon the nature of the polyurethane elastomers and vulcanizable rubbers to be bonded. The preferred proportions are illustrated in the various examples disclosed supra.

The synthesis of the grafted polyurethane joining compositions may be performed in any appropriate solvent. Such solvents include, but are not limited to, N,N-dimethylacetamide, dimethylformamide and dimethylsulfoxide. Temperatures sufficient to form the requisite covalent bonds may range from about room temperature to about 160° C. The range of room temperature to about 80° C. is preferred. To assure good bond formation, the grafted polyurethane joining mixture should be heated for one or more hours. The reaction mixture is then cooled and precipitated in an appropriate solvent such as methanol. The product is washed with an appropriate solvent, such as a petroleum distillate, and dried.

The grafted polyurethane joining composition thus produced may be utilized in solid or solution form. When utilized in solid form, sheets of the grafting composition will be prepared and then interposed between sheets of vulcanizable rubbers and polyurethane elastomers to be bonded. In a preferred form, the grafted polyurethane joining composition is utilized as a solution.

When the grafted polyurethane joining composition is utilized in liquid form, it is best interposed between polyurethane and vulcanizable rubber layers by means of conventional casting processes such as solution or dip casting. When dip casting is used to produce laminates joined by a novel grafted polyurethane joining composition of the present invention, the base polyurethane elastomer composition, the grafted polyurethane joining composition and the vulcanizable rubber composition are applied in series by dipping an appropriate mandrel into individual solutions containing the various component compositions. The thickness of the various layers can be controlled by the concentration of the solution and by the number of times the mandrel is dipped therein.

To illustrate this process, a trilaminate comprised of polyurethane-vulcanizable rubber-polyurethane, wherein the layers are joined by the grafted polyurethane joining composition of this invention, can be constructed as follows. The mandrel is first dipped into a solvent solution containing the base polyurethane elastomer composition. Following evaporation of the polyurethane solvent, the mandrel is dipped into a solution containing the grafted polyurethane joining composition. Again, following evaporation of the solvent, the mandrel is dipped into a solution containing vulcanizable rubber. Since more than two layers are desired, the process is continued by, again evaporating the rubber solvent, and then dipping the mandrel into the grafted polyurethane joining composition. Following solvent evaporation the mandrel is dipped in the base polyurethane solution.

After the laminates have been constructed and the solvents evaporated, the assembled composite compositions are heated at a temperature sufficient to cause bonding and vulcanization of the rubber. The exact time and temperature of curing will vary depending upon the nature of the compositions being bonded as well as on the nature of the particular components utilized in forming the grafted polyurethane joining composition. In general however the temperatures during curing will be between about 125° C. to 160° C. and the curing time will range from about 0.5 hours to about 4.0 hours. Preferably the complete system is heated at about 150° C. for about one hour.

The present invention will be more readily understood from a consideration of the following specific examples which are given for purposes of illustration only and are not intended to limit the scope of the invention in any way.

EXAMPLE I

This example illustrates synthesis of a first grafted polyurethane joining composition, referred to herein as GPJC-1.

In constructing this grafted joining composition, a first mixture comprised of:

| | |
|---|---|
| Dimethylacetamide (DMAC) | 400 parts |
| Polyetherurethane (BIOMER) | 100 parts |
| Polybutadiene glycol (M.W. 1350) | 12 parts | was heated to approximately 130° C. (BIOMER is the trademark for polyetherurethane supplied, as a 30% (W/W) solution in dimethylacetamide, by Ethicon, Summerville, N.J.)

Into the hot first reaction mixture was added, with constant stirring, a second mixture comprised of 4.5 parts of 4,4'-diphenylmethane diisocyanate (MDI) as a 20% (W/W) solution in DMAC. The rate of addition was about 0.5 ml per minute. After the MDI was added, heating at about 130° C. was continued for about one hour. The resultant reaction mixture was allowed to cool, then the product was precipitated with methanol. The product (GPJC-1) was captured on filter paper, washed twice with petroleum ether and then dried.

When prepared by this method the grafted polyurethane joining material precipitated in the form of small straw agglomerates of the fiber type. Based on carbon 13 nuclear magnetic resonance and infrared radiation spectrums, the grafted polyurethane produced in this example had the following structure:

GRAFTED-POLYURETHANE

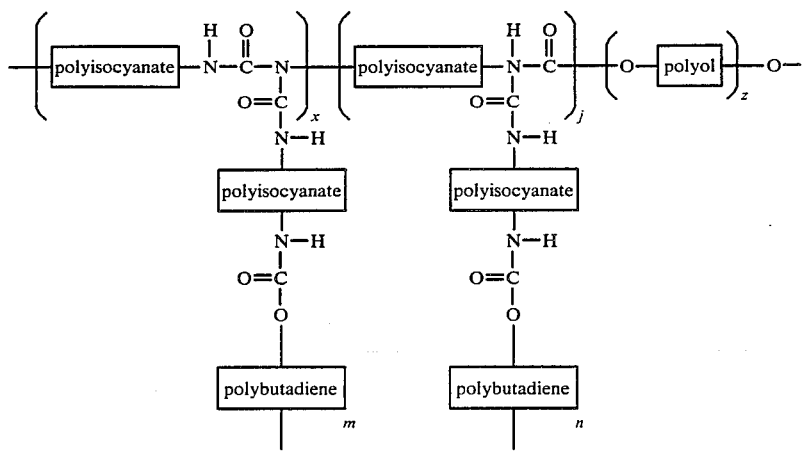

EXAMPLE II

This example illustrates synthesis of a second grafted polyurethane joining composition, referred to herein as GPJC-2.

In constructing this grafted joining composition a first mixture comprised of:

| | |
|---|---|
| Dimethylacetamide (DMAC) | 400 parts |
| Polyetherurethane (BIOMER) | 100 parts |
| Polybutadiene glycol (M.W. 1350) | 25 parts | was heated to approximately 130° C. Into the hot reaction mixture was added, with constant stirring, a second mixture comprised of 9 parts of 4,4'-diphenylmethane diisocyanate (MDI) as a 20% (W/W) solution in DMAC. The rate of addition was about 0.5 ml per minute. After the MDI was added, heating at about 130° C. was continued for about one hour. The resultant reaction mixture was allowed to cool, then the product was precipitated with methanol. The product (GPJC-2) was captured on filter paper, washed twice with petroleum ether and then dried. The the grafted polyurethane product was 9–14% (W/W) grafted polybutadiene glycol.

EXAMPLE III

This example illustrates synthesis of a third grafted polyurethane composition, referred to herein as GPJC-3.

In constructing this grafted joining composition, a first mixture comprised of:

| | |
|---|---|
| Dimethylacetamide (DMAC) | 450 parts |
| Polyetherurethane (BIOMER) | 50 parts |
| Polybutadiene glycol (M.W. 1350) | 25 parts | was heated to approximately 45° C. Into the warm reaction mixture was added, with constant stirring, a second mixture comoprised of 4.5 parts of 4,4'-diphenylmethane diisocyanate (MDI) as a 20% (W/W) solution in DMAC. The rate of addition was about 0.5 ml per minute. After the MDI was added, heating at about 45° C. was continued for about one hour. The resultant reaction mixture was allowed to cool, then the product was precipitated with methanol. The (GPJC-3) product was captured on filter paper, washed twice with petroleum ether and then dried. The grafted polyurethane product was 9–14% (W/W) grafted polybutadiene glycol.

EXAMPLE IV

This example illustrates synthesis of a fourth grafted polyurethane composition, referred to herein as GPJC-4.

In constructing this grafted joining compisition, a first mixture comprised of:

| | |
|---|---|
| Dimethylacetamide (DMAC) | 450 parts |
| Polyetherurethane (BIOMER) | 50 parts |
| Polybutadiene glycol (M.W. 1350) | 12.5 parts | was heated to approximately 45° C. Into the warm reaction mixture was added, with constant stirring, a second mixture comprised of 4.5 parts of 4,4'-diphenylmethane diisocyanate (MDI) as a 20% (W/W) solution in DMAC. The rate of addition was about 0.5 ml per minute. After the MDI was added, heating at about 45° C. was continued for about one hour. The resultant reaction mixture was allowed to cool, then the product was precipitated with methanol. The product (GPJC-4) was captured on filter paper, washed twice with petroleum ether and then dried. The grafted polyurethane product was 9–14% (W/W) grafted polybutadiene glycol.

EXAMPLE V

This example illustrates use of a grafted polyurethane joining composition to construct laminated structures composed of polyurethane elastomers and vulcanizable rubber laminants.

Implantable biomedical devices are often composed of polyurethane because the polymer is highly resistant to wear and chemical degradation. It is also highly biocompatible. Unfortunately it is not totally resistant to moisture permeation. Unlike polyurethane, many butyl-rubbers are impermeable to moisture. Unfortunately the butyl-rubbers are not biocompatible.

To provide an implantable structure having the advantages of both polyurethane elastomers and butyl-rubber, a trilaminate composition comprised of polyurethane/butyl-rubber/polyurethane was prepared. Such a trilaminate composition is especially useful in implantable biomedical devices such as the left ventricular assist device (LVAD).

The trilaminate structure illustrated herein was made by conventional solution casting processes. In constructing the trilaminate structure, a base layer of polyurethane elastomer was applied by dipping a mandrel into a solution of 10% (W/W) polyetherurethane in dimethylacetamide (DMAC). The DMAC solvent was then evaporated with heat. The dipping process was repeated three more times, resulting in a polyurethane layer of approximately 0.008 inches.

The grafted polyurethane joining composition (GPJC-1) was applied as a solution, referred to herein as "Grafted Joining Solution #1", wherein the solution contained:

| Dimethylacetamide (DMAC) | 270 parts |
| Grafted Polyurethane (GPJC-1, as prepared in Example I) | 20 parts |
| Polyetherurethane (solids) | 10 parts |
| Dicumyl Peroxide | 0.2 parts |

The mandrel was dipped into this solution once and then the solvents were evaporated.

The mandrel was then dipped four times into the vulcanizable rubber solution. The solution was comprised of 17% (W/W) compounded chlorobutyl rubber in isoparafinic solvent, boiling point 150°-170° C. (In this example ISOPAR G was used. ISOPAR G is a trademark for an isoparafinic solvent produced by EXXON, Houston, Tex.)

The chlorobutyl rubber formulation was mixed on a four inch by nine inch mill with a roll temperature of 100° C. The chlorobutyl rubber formulation included:

| Chlorobutyl Rubber | 100 parts |
| Zinc Oxide (ZnO) | 5 parts |
| Polybutadiene Glycol | 2 parts |
| Stearic Acid | 1 part |
| Tetramethylthiuram Disulfide (TMTDS) | 0.25 part |
| Magnesium Oxide (MgO) | 0.1 part |
| Dicumyl Peroxide | 0.02 part |

To improve wetting of the polyurethane layer with the chlorobutyl rubber, the polyurethane layer was dipped in the isoparaffinic solvent immediately prior to applying the rubber. Following evaporation of the solvent with heat, the mandrel was dipped into the chlorobutyl rubber solution four times. This resulted in a chlorobutyl rubber laminate having a thickness of approximately 0.008 inches.

The outer polyurethane layer was started by once dipping the mandrel into the grafted polyurethane joining solution, followed by four dippings in the original polyetherurethane (BIOMER, 10%, W/W, in DMAC) solution.

The good adherence of the grafted polyurethane and the chlorobutyl rubber is accomplished by creating chemical covalent bonds between the two materials. All required chemical reactions, including vulcanization of the chlorobutyl rubber, crosslinking between the unsaturated sites in the vulcanizable rubber and polybutadiene of the grafted polyurethane as well as crosslinking in the grafted polyurethane are induced by heat. The entire polyurethane/chlorobutyl-rubber/polyurethane trilaminate was therefore heated at about 150° C. for one hour. This temperature and curing time were sufficient to assure that all chemical reactions took place.

A peel test of the vulcanized trilaminate composition showed cohesive failure in the bulk of the chlorobutyl-rubber layer and not at the bond interface. Exposing the system to dichloromethane resulted in the swelling of the polyurethane and fracturing of the chlorobutyl-rubber inner layer, causing delamination. However neither water nor alcohols had any visible effect on the strength or appearance of the trilaminate.

EXAMPLE VI

This example is identical to Example V except that this example uses a different grafted polyurethane joining composition and butyl rubber formation to construct laminated structures composed of polyurethane elastomers and vulcanizable rubber laminants.

The polyurethane base and top layers of this example are the same as those disclosed in Example V except that in this example the mandrel was dipped into a solution of 10% (W/W) polyetherurethane in dimethylacetamide (DMAC) six times (for each layer) instead of three times.

In this example the grafted polyurethane joining composition was applied as a solution (referred to herein as "Grafted Joining Solution #2), wherein the solution contained:

| Dimethylacetamide (DMAC) | 270 parts |
| Grafted Polyurethane (GPJC-3, as prepared in Example III) | 20 parts |
| Polyetherurethane (solids) | 10 parts |

The butyl rubber formulation was a 19% solution (in ISOPAR G) of a milled rubber composition referred to herein as "CB-3". This CB-3 formulation is comprised of:

| Chlorobutyl 1066 | 100 parts |
| Mistron Vapor Talc | 30 parts |
| Whitetex Clay | 30 parts |
| Parafinic Oil | 5 parts |
| Vonfre AP2 | 2 parts |
| Polyethylene AC617 | 3 parts |
| Stearic Acid | 1 part |
| Zinc Oxide | 5 parts |
| Tetramethylthiuram Disulfide (TMTDS) | 1 part |
| Benzothiazyl Disulfide (MBTS) | 2 parts |
| Sulfur | 1 part |

The trilaminate was dipped by:

| 6 dips | 10% (W/W) Polyetherurethane in DMAC |
| 2 dips | Grafted Joining Solution #2 |
| 6 dips | CB-3 Rubber Solution |
| 2 dips | Grafted Joining Solution #2 |
| 6 dips | 10% (W/W) Polyetherurethane in DMAC |

In this example the final laminate was cured for 1.5 hours at 160° C. Testing showed the strength was such that on separation, failure occurred within the butyl rubber layer and not at the interface.

EXAMPLE VII

This example is identical to Example VI except that the butyl rubber formulation used herein did not contain any sulfur. (This butyl rubber formulation without sulfur is referred to herein as "CB-4".) Tests on the trilaminate produced with CB-4 again showed the adhesive strength between the polyurethane and butyl rubber exceeded the strength of the butyl rubber.

EXAMPLE VIII

This example is identical to Example VI except that: (1) the trilaminate was formulated using a grafted joining solution referred to herein as "Grafted Joining Solution #3" (rather than Grafted Joining Solution #2), and (2) the trilaminate was cured for three hours at 155° C. (instead of for 1.5 hours at 160° C.).

"Grafted Joining Solution #3" was formulated using:

| | |
|---|---|
| Dimethylacetamide (DMAC) | 255 parts |
| Grafted Polyurethane (GPJC-3, as prepared in Example III) | 45 parts |

Again tests on this laminate showed the adhesive strength between the polyurethane and butyl rubber exceeded the strength of the butyl rubber.

EXAMPLE IX

This example is identical to Example VIII except that the trilaminate was cured for 1.5 hours at 160° C. (instead of 3 hours at 155° C.). Tests on this laminate, again showed the adhesive strength between the polyurethane and butyl rubber exceeded the strengths of the butyl rubber.

EXAMPLE X

This example is identical to Example IX except that a CB-4 butyl rubber solution (rather than a CB-3) was used to produce the laminate. (CB-4 is the same as CB-3 except that CB-4 does not contain any sulfur.) Again, tests on this laminate showed the adhesive strength between the polyurethane and butyl rubber exceeded the strengths of the butyl rubber.

EXAMPLE XI

This example is identical to Examples VI and VIII (which illustrate use of butyl rubber solution CB-3) except that the trilaminate produced herein was formulated using a grafted polyurethane joining solution referred to herein as "Grafted Joining Solution #4". This example is identical to Example VIII (but different from VI) in that the trilaminate produced herein was also cured for 3 hours at 155° C. (instead of 1.5 hours at 160° C.).

"Grafted Joining Solution #4" was formulated using:

| | |
|---|---|
| Dimethylacetamide (DMAC) | 255 parts |
| Grafted Polyurethane (GPJC-4, as prepared in Example IV) | 45 parts |

Again, tests on this laminate showed the adhesive strength between the polyurethane and butyl rubber exceeded the strengths of the butyl rubber.

EXAMPLE XII

This example is identical to Example XI except that the laminate produced herein was cured for 1.5 hours at 160° C. (rather than 3 hours at 155° C.). This curing difference had no noticeable effect on the laminate produced. Again, the strength was such that on separation, failure occurred within the butyl rubber layer and not at the interface.

Thus it can be seen that the present invention provides an improved process for producing laminates comprised of polyurethane elastomers and vulcanizable rubbers. Since the process of the invention uses novel grafted polyurethane joining compositions to bond the polyurethane elastomers and vulcanized rubber laminates, the laminates are covalently bound. Since the component parts of the novel grafted polyurethane joining compositions are also covalently bound to one another, the components of the joining composition will not leach through the laminate layers. In addition, since the laminated layers are covalently bound to one another, the process of the present invention produces laminated systems with bond strengths so strong that failure of the laminated product will result from failure in one of the laminated layers rather than failure at the bond interface.

Various modifications of the invention will become apparent to those skilled in the art from the foregoing description and drawing. Such modifications are intended to fall within the scope of the appended claims.

What is claimed is:

1. A process for producing covalently bonded laminates comprised of polyurethane elastomer and vulcanized rubber layers comprising:
    interposing between a thickness of polyurethane elastomer composition and a thickness of vulcanizable rubber composition a thickness of grafted polyurethane joining composition, said grafted polyurethane joining composition being comprised of polyurethane elastomer segments, polyisocyanate segments and hydroxyl containing polybutadiene segments wherein said polyurethane elastomer segments and a first functional (NCO) group on said polyisocyanate segments are covalently bonded to one another, and said hydroxyl containing polybutadiene segments and a second functional (NCO) group on said polyisocyanate segments are covalently bonded to one another,
    and heating the resulting assembly.

2. A process according to claim 1, wherein said hydroxyl containing polybutadiene segments are hydroxyl terminated polybutadiene segments.

3. A process according to claim 2, wherein said hydroxyl terminated polybutadiene segments are hydroxyl terminated polybutadiene glycol segments.

4. A bonded laminated structure comprised of polyurethane elastomer layers and vulcanized rubber layers wherein said polyurethane elastomer layers and said vulcanized rubber layers are covalently bonded by means of a grafted polyurethane joining composition comprised of polyurethane elastomer segments, polyisocyanate segments and hydroxyl containing polybutadiene segments wherein said polyurethane elastomer segments and a first functional (NCO) group on said polyisocyanate segments are covalently bonded to one another, and said hydroxyl containing polybutadiene segments and a second functional (NCO) group on said polyisocyanate segments are covalently bonded to one another.

5. A bonded laminated structure according to claim 4, wherein said hydroxyl containing polybutadiene segments are hydroxyl terminated polybutadiene segments.

6. A bonded laminated structure according to claim 5, wherein said hydroxyl terminated polybutadiene segments are hydroxyl terminated polybutadiene glycol segments.

7. A bonded trilaminated structure comprised of a butyl rubber layer sandwiched between two layers of polyetherurethane wherein said butyl rubber layer and said polyetherurethane layers are covalently bonded by means of a grafted polyurethane joining composition comprised of polyetherurethane segments, polyisocyanate segments and hydroxyl terminated polybutadiene glycol segments wherein said polyetherurethane segments and a first functional (NCO) group in said polyisocyanate are covalently bonded to one another, and said hydroxyl terminated polybutadiene segments and a second functional (NCO) group on said polyisocyanate are covalently bonded to one another.

* * * * *

UNITED STATES PATENT AND TRADEMARK OFFICE
CERTIFICATE OF CORRECTION

PATENT NO. : 4,552,816

DATED : November 12, 1985

INVENTOR(S) : Spahic, *et al.*

It is certified that error appears in the above-indentified patent and that said Letters Patent is hereby corrected as shown below:

Column 1, between lines 7 and 8 insert --The government has a non-exclusive, non-transferrable, irrevocable, paid-up license to practice or have practiced for or on behalf of the United States, the subject invention--.

Signed and Sealed this

Fifteenth Day of November, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 4,552, 816
DATED : November 12, 1985
INVENTOR(S) : Spahic, *et al.*

It is certified that error appears in the above-indentified patent and that said Letters Patent is hereby corrected as shown below:

Delete the language added by the Certificate of Correction issued November 15, 1994. As the first two sentences of Column 1, insert —This invention was made under NO 1-HV-02908 awarded by Public Health Service/National Institutes of Health; National Heart, Lung and Blood Institute. The government has certain rights—.

Signed and Sealed this

Twentieth Day of June, 1995

*Attest:*

BRUCE LEHMAN

*Attesting Officer*  *Commissioner of Patents and Trademarks*